United States Patent [19]

Zimmerman et al.

[11] Patent Number: 5,202,361
[45] Date of Patent: Apr. 13, 1993

[54] PRESSURE-SENSITIVE ADHESIVE

[75] Inventors: Patrick G. Zimmerman, St. Paul; Gaddam N. Babu, Woodbury; Lang N. Nguyen, St. Paul, all of Minn.; Ingrid E. Blair; George F. Vesley, both of Hudson, Wis.

[73] Assignee: Minnesota Mining and Manufacturing Company, St. Paul, Minn.

[21] Appl. No.: 812,280

[22] Filed: Dec. 23, 1991

[51] Int. Cl.$^5$ .............................. C08J 3/28; C09J 7/02; B32B 27/30
[52] U.S. Cl. ................................. 522/120; 522/116; 522/121; 522/158; 524/533; 524/534; 526/931; 428/345; 428/355
[58] Field of Search ................. 524/533, 534; 522/121, 522/158, 120; 526/931; 428/345, 355

[56] References Cited

U.S. PATENT DOCUMENTS

| | | | |
|---|---|---|---|
| 3,635,755 | 1/1972 | Balinth et al. | 117/122 F |
| 3,954,697 | 5/1976 | McConnell et al. | 526/350 |
| 4,178,272 | 12/1979 | Meyer, Jr. et al. | 260/27 R |
| 4,181,752 | 1/1980 | Martens et al. | 427/54.1 |
| 4,243,500 | 1/1981 | Glennon | 204/159.12 |
| 4,288,358 | 9/1981 | Trotter et al. | 260/31.8 M |
| 4,364,972 | 12/1982 | Moon | 427/54.1 |
| 4,414,275 | 11/1983 | Woods | 522/121 |
| 5,079,047 | 1/1992 | Bogaert et al. | 526/931 |
| 5,112,882 | 5/1992 | Babu et al. | 522/158 |

FOREIGN PATENT DOCUMENTS 416921 6/1990 European Pat. Off. .

OTHER PUBLICATIONS

U.S. Ser. No. 07/585,227 filed Sep. 19, 1990, "Moisture Curable Polyolefin Curable Pressure Sensitive Adhesive".
U.S. Ser. No. 07/605,653 filed Oct. 30, 1990, "Pressure Sensitive Adhesive Based on Ethylenically Unsaturated α-Olefin Polymer Cured with Hydrosilane".
U.S. Ser. No. 07/614,037 filed Nov. 15, 1990, "Macromolecular Monomers from Living Polymers".
U.S. Ser. No. 07/403,662 filed Sep. 6, 1989, "Radiation Curable Polyolefin Pressure-Sensitive Adhesive".
U.S. Ser. No. 07/775,684 filed Oct. 10, 1991, "Macromolecular Monomers From Living Polymers".
U.S. Ser. No. 07/614,251 filed Nov. 15, 1990, "Polyolefin Pressure Sensitive Adhesive Compositions Containing Macromonomers".
U.S. Ser. No. 07/799,118 filed Nov. 27, 1991, "Radiation Curable Saturated Polyolefin Pressure-Sensitive Adhesive".
U.S. Ser. No. 07/201,712 filed Jun. 28, 1988, "Pressure-Sensitive Adhesive Tapes".
U.S. Ser. No. 07/210,713 filed Jun. 28, 1988, "Pressure-Sensitive Adhesive".

Primary Examiner—Paul R. Michl
Assistant Examiner—Tae H. Yoon
Attorney, Agent, or Firm—Gary L. Griswold; Walter N. Kirn; Robert W. Sprague

[57] ABSTRACT

Radiation-curable, tackifier-free compositions are provided which contain: (i) a blend of certain acrylate esters and monoethylenically-unsaturated copolymerizable monomers; (ii) certain α-olefin polymers; and (iii) a photoinitiator and optionally, a crosslinker. Pressure-sensitive adhesives having good adhesion to both low and high energy surfaces as well as possessing excellent low and high temperature performance properties are prepared by exposing the radiation-curable compositions to light having a wavelength in the range of from about 280 to 400 nm.

29 Claims, No Drawings

PRESSURE-SENSITIVE ADHESIVE

FIELD OF THE INVENTION

This invention relates to a radiation-curable composition. This invention also relates to a pressure-sensitive adhesive made from a radiation-curable composition. This invention further relates to substrates coated with a pressure-sensitive adhesive.

BACKGROUND OF THE INVENTION

Pressure-sensitive adhesives ("psa's") made from the photopolymerization of an alkyl acrylate (e.g., isooctyl acrylate) and a polar copolymerizable monomer (e.g., acrylic acid, N-vinyl pyrrolidone, etc.) are well known in the art; see, for example, U.S. Pat. Nos. 4,181,752; 4,364,972; and 4,243,500. Such acrylic-based psa's exhibit good adherence to high energy (i.e., polar) substrates such as metal and painted steel surfaces, but exhibit limited adhesion to low energy (i.e., nonpolar) substrates such as polyethylene and polypropylene. Additionally, whereas the acrylic-based psa's have good high temperature (e.g., 100° C.) performance properties due to the presence of the polar copolymerizable monomers (which increase the cohesive or internal strength of the adhesive), they also exhibit limited adhesion at low temperatures (e.g., −45° C.).

Pressure-sensitive adhesives based upon polymers of alpha ($\alpha$)-olefins are also well known; see, for example, U.S. Pat. Nos. 3,635,755; 3,954,697; 4,178,272; and 4,288,358 as well as EPO No. 416,921. Psa's based upon $\alpha$-olefin polymers tend to exhibit good adhesion to low energy substrates, but only moderate adhesion to high energy substrates. Additionally, they have good low, but limited high, temperature performance properties.

As can be seen from the foregoing discussion, acrylic- and $\alpha$-olefin-based psa's do not individually exhibit a broad spectrum of desirable adhesive properties. Mere blending together of the two different psa's does not provide an acceptable adhesive because the resulting blend does not produce a psa with a wide spectrum of performance properties either. It was against this background that the development of a psa material which exhibits good adhesion to both low and high energy substrates as well as good high and low temperature performance properties was sought.

SUMMARY OF THE INVENTION

By the present invention, it has been discovered that if certain alkyl acrylates, monoethylenically-unsaturated monomers copolymerizable therewith, and polymers of $\alpha$-olefins are photopolymerized in the presence of a photochemically effective amount of a photoinitiator and optionally, a crosslinker, results in a psa which exhibits a broad spectrum of desirable properties, e.g., both good high and low temperature performance properties and excellent adhesion to low and high energy substrates.

Accordingly, in one embodiment of the present invention there is provided a radiation-curable, tackifier-free composition comprising: (a) 100 parts by weight (pbw) of a blend comprising: (i) about 60 to 100 pbw acrylic acid ester of a monohydric alcohol having an average of 4 to 12 carbon atoms; and (ii) 0 to about 40 pbw monoethylenically-unsaturated monomer copolymerizable with the acrylic acid ester whose homopolymer has a glass transition temperature ($T_g$) greater than about 50° C.; and 10 to 100 pbw polymer of alpha-olefins having a $T_g$ in the range of about −70° to −10° C. and having a weight average molecular weight (Mw) of about 25,000 to about 5,000,000, wherein at least 60 mole percent of the alpha-olefins have 6 to 18 carbon atoms; and (c) photochemically effective amount of a material selected from the group consisting of:
(i) photoinitiator of free-radical polymerization;
(ii) photoinitiator of free-radical polymerization and polyfunctional acrylate crosslinker; and
(iii) photoinitiator of free-radical polymerization that is also a photocrosslinker.

The inventive radiation-curable composition does not require tackifying resin in contrast to many conventional acrylic adhesives, such as disclosed in U.S. Pat. No. 4,243,500. Such tackifying resins are excluded from the present invention because their addition results in an increase in the $T_g$ of the polymer matrix which has a negative effect on low temperature stability; they may act as chain transfer agents during the polymerization process, thereby lowering the molecular weight of the resulting psa; and they tend to migrate to the surface of the adhesive upon aging thereby causing the psa to deteriorate.

In another embodiment, the present invention provides a psa made by the photopolymerization of the foregoing disclosed radiation-curable composition. As shown later herein by the examples, the inventive psa's exhibit good adhesion to both low and high energy surfaces and have excellent high and low temperature performance properties.

In still another embodiment of the present invention are provided surfaces coated with the inventive psa.

Other aspects, benefits, and advantages of the present invention are apparent from the detailed description, examples, and claims.

DETAILED DESCRIPTION OF THE INVENTION

The acrylic acid esters of monohydric alcohols useful in this invention constitute about 60 to 100 parts by weight (pbw), and preferably about 70–95 pbw, per 100 total pbw of a blend of the acrylic acid ester and a monoethylenically-unsaturated copolymerizable monomer and are the monofunctional acrylic acid esters of non-tertiary alcohols which have from 4 to about 12 carbon atoms. Such monomers include, but are not limited to, isooctyl acrylate, 2-ethylhexyl acrylate, isononyl acrylate, decyl acrylate, dodecyl acrylate, hexyl acrylate, and butyl acrylate.

Examples of monoethylenically-unsaturated copolymerizable monomers whose homopolymer has a glass transition temperature ($T_g$) above about 50° C. include, but are not limited to, strongly polar monomers such as acrylic acid, itaconic acid, and substituted acrylamides such as N,N-dimethylacrylamide and N-octylacrylamide; and moderately polar monomers such as 2-hydroxyethyl acrylate, N-vinyl pyrrolidone, N-vinyl caprolactam, acrylonitrile, and tetrahydrofurfuryl acrylate, and non-polar monomers such as, for example, isobornyl acrylate. The monoethylenically-unsaturated copolymerizable monomer is present in an amount of from 0 to about 40 pbw, and preferably from about 5–30 pbw per 100 total pbw of the blend of acrylic acid ester and monoethylenically-unsaturated copolymerizable monomer.

The alpha-olefin polymer (also called poly-(α-olefin) and poly-(1-alkene) used in the present invention preferably has the general formula:

$$H-(CH_2-CRH)_n-H$$

wherein:

R is one or more monovalent hydrocarbyl group(s) with the proviso that at least 60 mole %, and preferably at least 80 mole %, of the R groups contain from 6 to 18 carbon atoms, and preferably 6 to 12 carbon atoms; and n is an integer in the range of from 80 to 50,000.

The homopolymer of the α-olefins used in the present invention should have a $T_g$ in the range of about $-70°$ C. to $-10°$ C., and preferably from about $-60°$ C. to $-25°$ C. Representative examples of α-olefin monomers that can be used to make the poly(α-olefin) include, but are not limited to, ethylene, propylene, 1-butene, 1-pentene, 1-hexene, 1-heptene, 1-octene, and branched α-olefins such as 2-methyl-1-butene, 2-ethyl-1-butene, 3-methyl-1-hexene, 2-ethyl-1-hexene, 5-methyl-1-hexene, 5-ethyl-1-hexene, etc. Mixtures of these monomers can be copolymerized to poly(α-olefins) using coordination catalysts of the Ziegler-Natta type by methods well known to those skilled in the art of polymer chemistry. The α-olefin polymer should have a weight average molecular weight (Mw) of about 25,000 to about 5,000,000, preferably from about 50,000 to about 3,500,000; and most preferably from about 50,000 to about 250,000. The alpha-olefin polymer should be present in the radiation-curable composition in an amount of from 10 to 100 pbw and preferably from 30 to 70 pbw.

The radiation-curable composition of the present invention contains photochemically effective amounts of one of the following: (i) a photoinitiator of free-radical polymerization; (ii) an initiator of free-radical polymerization and a polyfunctional acrylate crosslinker; or (iii) a photoinitiator of free-radical polymerization which is also a photocrosslinker. In this application, the term "photochemically effective amount of photoinitiator" refers to the amount of photoinitiator needed to initiate free-radical polymerization of the acrylic acid ester and monoethylenically-unsaturated copolymerizable monomers. A "photochemically effective amount of crosslinker" is the amount of crosslinker needed to induce crosslinking between the acrylic polymer chains and/or the poly(α-olefin) chains.

Photoinitiators which are useful include the benzoin ethers, such as benzoin methyl ether or benzoin isopropyl ether; substituted acetophenones, such as 2,2-diethyoxyacetophenone and 2,2-dimethoxy-2-phenyl-1-phenylethanone ((Irgacure TM 651 photoinitiator available from Ciba-Geigy Corp. or Esacure TM KB-1 photoinitiator available from Sartomer); substituted alpha-ketols, such as 2-methyl-2-hydroxy propiophenone; aromatic sulfonyl chlorides, such as 2-naphthalenesulfonyl chloride; and photoactive oximes, such as 1-phenyl-1,2-propanedione-2-(O-ethoxycarbonyl)oxime. Preferably, the photoinitiator is present in an amount of about 0.01 to about 5 pbw per 100 pbw of the radiation-curable composition.

Polyfunctional acrylate crosslinkers that may be used in the present invention from about 0.01 up to about 20 pbw per 100 pbw of the radiation-curable composition are acrylic acid esters of polyhydric alcohols such as 1,6-hexanediol diacrylate (in Chemical Abstracts the name is 2-propenoic acid 1,6-hexanediyl ester {HDDA}) as well as those disclosed in U.S. Pat. No. 4,379,201, such as trimethylolpropane triacrylate, pentaerythritol tetracrylate, 1,2-ethyleneglycol diacrylate, 1,2-dodecanediol diacrylate, and the like. Most preferably, the polyfunctional acrylate crosslinker is present in an amount of about 0.01 to 5 pbw per 100 pbw of the radiation-curable composition.

Materials which function as both photoinitiators and photocrosslinkers in the present invention include the chromophore substituted bistrichloromethyl triazines such as those described in U.S. Pat. Nos. 4,391,681; 4,330,590; and 4,329,384, e.g., 2,4-bis(trichloromethyl)-6-(4-methoxyphenyl)-s-triazine; 2,4-bis(trichloromethyl)-6-(3,4-dimethoxyphenyl)-s-triazine; 2,4-bis(trichloromethyl)-6-(3,5-dimethoxyphenyl)-s-triazine and the like; 2,4-bis(trichloromethyl)-6-(1-naphthyl)-s-triazine; 2,4-bis(trichloromethyl)-6-(2-naphthyl)-s-triazine; and 2,4-bis(trichloromethyl)-6-(1-(4-methoxynaphthyl))-s-triazine. These compounds and the like are useful as photoactive agents when present in an amount from about 0.01 to about 5 pbw per 100 pbw of the radiation curable composition. They can be used alone or with a photoinitiator (described above). The usefulness of these compounds is in their ability to impart high temperature shear to the inventive compositions.

In a preferred embodiment of the present invention, microspheres are added to the radiation-curable composition. When microspheres are present, the polymerized adhesive will have a foam-like appearance. In a most preferred embodiment, hollow polymeric microspheres having average diameters of from 5 to 200 micrometers are blended into the radiation-curable composition in amounts of from about 15% to about 75% by volume prior to coating. In this embodiment it is possible to include unexpanded microspheres in the radiation-curable composition and subsequently heat them to cause expansion, but it is generally preferred to mix the expanded microspheres into the adhesive. This process makes it easier to ensure that the hollow microspheres in the final adhesive are substantially surrounded by at least a thin layer of adhesive. Useful polymeric microspheres are described in U.S. Pat. Nos. 3,615,972, 4,075,238, and 4,287,308. Microspheres are available from Kema Nord Plastics, under the tradename Expancel. In expanded form, the microspheres have a specific density of approximately 0.02–0.036 g/cc.

Also useful in the radiation-curable compositions are glass microspheres, as are described in U.S. Pat. No. 4,223,067, having an average diameter of from 5 to 200 micrometers, preferably from about 20 to about 80 micrometers. Such microspheres may comprise 5% to 65% by volume of the psa. The psa layer should be at least 3 times as thick as the diameter of the glass microspheres, preferably at least 7 times as thick.

In another embodiment, the radiation-curable composition of this invention may be used to make a cellular psa membrane as is described in U.S. Pat. No. 4,415,615.

Other useful addenda which can be blended into the radiation-curable composition include, but are not limited to, fillers, pigments, plasticizers, fibrous reinforcing agents, woven and nonwoven fabrics, foaming agents, antioxidants, stabilizers, fire retardants, and viscosity adjusting agents.

Other useful fillers include fumed silica. An especially useful filler is hydrophobic silica as disclosed in U.S. Pat. Nos. 4,710,536, and 4,749,590. In another preferred embodiment of the present invention, the psa layer further contains from about 2 to about 15 phr of a hydrophobic silica having a surface area of at least 10 m²/g.

The radiation-curable composition of the present invention is preferably prepared by dissolving the α-olefin polymer in the mixture of free-radically polymerizable monomers, photoinitiator, and photocrosslinker (if used). The monomers can be added in any order, but preferably the monoethylenically-unsaturated copolymerizable monomer is added incrementally last. Glass microspheres and other addenda are blended into the solution to provide the psa composition suitable for coating and cure.

This liquid composition is then coated onto a flexible carrier web using any conventional means such as roller coating, dip coating, knife coating, or extrusion coating and subsequently polymerized in an inert, i.e., oxygen free, atmosphere, e.g., a nitrogen atmosphere as is well-known in the art.

The composition can be cured in air by covering a layer of the photoactive coating with a plastic film which is substantially transparent to ultraviolet radiation, but impervious to oxygen, and subsequently irradiating the composition through that film using fluorescent-type ultraviolet lamps which emit UV light in the wavelength range absorbed by the particular photoinitiator used. Several different lamps which are commercially available may be used. These include medium pressure mercury lamps and low intensity fluorescent lamps, each having various emission spectra and emission maxima between 280 and 400 nanometers. For convenience, commercially available fluorescent black lights with a maxima at 351 nanometers and 90% of the emissions between 300 and 400 nanometers (nm) are utilized in the examples illustrating the invention. In general, the total radiation dose should be between about 400–600 milliJoules/cm². It is preferable that at least about 75 percent of the radiation be between 300 and 400 nm. Maximum efficiency and rate of polymerization is dictated by the relationship between emission properties of the radiation source and the absorption properties of the photoactive compounds employed. The photopolymerization can also be carried out in an inert atmosphere, however, tolerance to oxygen can be increased by including an oxidizable tin compound in the composition as taught in U.S. Pat. No. 4,303,485.

Psa tapes of the invention may contain more than one layer. Such multi-layered tapes include at least one layer of the cured phase-separated, pressure-sensitive adhesive. Such tapes may have a thin layer of a different pressure-sensitive adhesive laminated thereto, so that the adhesive of the invention is being used as a backing or core layer. The additional layer or layers may be any conventional adhesive known in the art, however, acrylic adhesives are preferred. Such multi-layered constructions can be prepared by processes disclosed in U.S. Pat. Nos. 4,818,610; 4,894,259; and 4,895,738. More preferably, additional adhesive layers include polymers of at least one alkyl acrylate monomer and a copolymerizable monomer whose $T_g$ is above about 50° C.

TEST METHODS

The following tests may be used to evaluate tapes of the invention.

Inherent Viscosity (I.V.)

The inherent viscosity of the poly(α-olefins) is measured according to ASTM D-857-70 (Reapproved 1977) using ten (10) ml. of a solution of poly(α-olefin) in n-hexane solutions of decreasing concentration in a Cannon-Fenske #50 viscometer which are equilibrated in a water bath maintained at 25° C.

Static Shear Value

The adhesive films as described in the examples are cut into strips 1.27 cm in width. One of the release liners is removed and the strip is placed with the adhesive side down onto an aluminum foil 125 micrometers (μm) thick and 1.6 cm wide. The remaining release liner film is removed from each of the strips to form a "test adhesive tape" and adhered by its adhesive to a flat, rigid stainless steel plate with exactly 1.27 cm length of tape in contact with the plate. Before testing, a 1000 g weight at 25° C. is placed over the bonded area for 15 minutes. Then the plate with the adhered tape is placed either at room temperature (RT) or in an aircirculating oven which has been preheated to 70° C., and after 15 minutes, a 250 g, 500 g, or 1,000 g weight is hung from the free end of the tape, with the panel tilted 2° from the vertical to insure against any peel forces. The time (in minutes) at which the weight falls is the "Static Shear RT(250 g), RT(500 g), RT(1000 g), or 70°(500)". The test is discontinued at 10,000 minutes if there is no failure.

T-Peel

T-Peel is measured as in ASTM D-1876-72 except that the test tapes were 1.27 cm in width and were tested only two hours after being adhered to aluminum foil backings. Results are reported in Newtons per decimeter (N/dm). Only cohesive failures are reported.

T-Peel provides a quantitative value of cohesive strength and is less sensitive to differences in the adhesion of the psa to the test surface.

90° Peel

The adhesive layer to be tested is slit to a width of 1.27 cm and self-adhered to a clean smooth stainless steel plate. A 1.6 cm wide strip of aluminum foil is adhered to the exposed face of the adhesive layer under the weight of a 2.25-kg hard rubber-covered steel roller, using 1 pass in each direction. After a 20 minute dwell time (at 23° C.) or in some instances 72 hours (as indicated in the data tables), the "90° Peel" is measured by moving the free end of the tape away from the steel plate at a rate of about 0.5 cm per second (using a tensile tester). The test specimen is then visually inspected to determine the mode of failure. The most common failure mode is by peel off the surface, abbreviated (pos-)—an adhesive failure where only traces, if any, of adhesive residue is left on the test plate. The specimen can also fail cohesively, leaving large areas of adhesive residue. Cohesive failures are abbreviated (coh). Unless specifically indicated in the data tables in the examples, the failure mode was by peel off the surface.

Cold Slam

A rigid vertical steel frame approximately 40 cm square is provided at its upper edge with a similarly dimensioned hinged frame/door. 19.4 square cm (2.54 cm×7.62 cm) of medium density silicone foam is mounted at the lower outer edge of the fixed vertical frame (where the hinged door impacts when slammed). Test panels are prepared as follows:

A 12.7 mm×125 mm pressure-sensitive attachment tape, carried on a release liner, is applied to the 15 mm×150 mm face of a rigid polyvinyl chloride test bar which is 6 mm thick. The tape is pressed into place by rolling once with a 6.8 kg roller. The liner is then removed from the tape and the exposed surface having the psa of the invention is attached to a freshly painted steel panel which is 100 mm×300 mm. Four test bars are attached, in two rows, in the lengthwise direction of the steep panel, with one end of each test bar extending beyond the end of the panel approximately 2.5 cm. After rolling the test panel with a 6.8 kg roller at a rate of 300 mm/min, the panel is allowed to dwell for 3 days at ambient temperature. The specimen is then conditioned at −40° C. for approximately 12 hours in the cold chamber, which houses the cold slam fixture as described above. The test panel is then secured in the fixture, with the test bars and the long dimension of the panel mounted in a horizontal direction.

The following test procedure was designed that some quantitative estimate of cold slam performance could be obtained, rather than simply a pass-fail rating.

The cold slam test is conducted by raising the hinged "door" to a predetermined angle, and releasing it, allowing it to strike the frame and expose the test panel to a cold shock. Ten slams are conducted at each of the five possible slam angles. The slam angle and the number of the slam (1–10) during which any of the four vinyl bars becomes delaminated or detached or recorded. A slam angle of 23 degrees is used initially. If there have been no failures after ten slams at the angle, the angle is increased to 45 degrees. This procedure is repeated until all test bars become detached, or until ten slams at the 180 degree slam angle have been conducted. If failure of one or more bars does occur at a specific stage during the initial ten slams, an additional 10 slams are conducted at that stage before advancing to the next slam angle. The results are recorded by documenting the door slam angle/stage and slam number in which delamination begins or failure occurs. Numerical designation in the form of stages 1–5 correspond to door slam angles of 23, 45, 68, 90 and 180 degrees, respectively. Lower stage numbers indicate poor cold slam properties, e.g., 1 or 2. Higher stage numbers indicate excellent cold slam properties, e.g., 4 to 5. The stage, number of slams at each stage, number of failures, and the failure mode are recorded.

EXAMPLES

This invention will be further illustrated by the following examples, although it will be understood that these examples are included merely for purposes of illustration and are not intended to limit the scope of the invention. Unless otherwise indicated, all parts are by weight.

Preparation of Poly(α-olefins)

Poly(α-olefin)#1; Poly(1-hexene); I.V.=1.2

The following reactants were charged (in the order named) to a dry, argon filled, circulating water jacketed glass reactor equipped with stirrer and dry ice condenser: 200 g dry heptane; 200 g of 1-hexene which had been passed through an alumina/silica chromatography column to remove impurities and then dried over molecular sieves; and 0.06 g (0.03 mole) of TiCl$_3$(AATiCl$_3$ TM) catalyst available from Stauffer Chemical Co., Inc. Polymerization was initiated by the slow addition of 8.2 ml. (0.015 mole) of (C$_2$H$_5$)$_3$Al (1.9M in toluene). Hydrogen was bubbled through the reaction mixture at a rate of 60 milliliters per minute (ml/min) to control the rate of reaction and the molecular weight (I.V.) of the poly-(1-hexene) polymer. The polymerization was exothermic, and the reaction mixture was cooled by circulating water through the reactor jacket to maintain the temperature at 25° C. Polymerization continued for five hours at which time one liter of methanol was added to precipitate the polymer. The polymer was washed with additional methanol to remove catalyst residues and dried under vacuum at 100° C. Poly(α-olefin) #1 had a yield of 85% by weight; a T$_g$ of −42° C., as determined by differential scanning calorimetry (DSC); and an I.V. of 1.2 dl/g in n-hexane solution.

Poly(α-olefin) #2; Poly(1-octene); I.V.=2.0 and
Poly(α-olefin); #3 Poly(1-octene); I.V.=5.0

The following reactants were charged to the reactor used to make Poly(α-olefin) #1 in the order named: 200 g of heptane, 200 g of 1-octene (dried over molecular sieves), and 0.06 g of TiCl$_3$(AATiCl$_3$ TM) catalyst. The polymerization was initiated by the slow addition of 0.28 ml of 1.9M (C$_2$H$_5$)$_3$Al which provided a molar ratio of (C$_2$H$_5$)$_3$Al/AATiCl$_3$ of 2.5/1.0. Hydrogen was bubbled through the reaction mixture to control the rate of reaction and molecular weight of the poly-(1-octene) polymer. For Poly(α-olefin) #2 the hydrogen flow rate was 16 ml/min and for Poly(α-olefin) #3 it was 60 ml/min. Polymerization continued for 7.5 hours at 25° C. after which the resulting polymer was precipitated in excess methanol and dried under vacuum at 100° C.

Poly(α-olefin) #2 had a T$_g$ of −59° C. and an I.V. of 2.0 dl/g measured in n-hexane solution.

Poly(α-olefin) #3 had a T$_g$ of −62° C., and an I.V. of 5.0 dl/g measured in n-hexane solution.

Example 1

Thirty (30) grams of a poly(1-hexene-co-propylene-co-ethylene) mole ratio: 68/30/2, designated TX-1771-98 (available from Eastman Chemicals) was cut into small pieces and placed in a screw cap bottle followed by 95 grams of isooctyl acrylate. This mixture was placed on a shaker for about 12 hours and then stirred for 4 hours with a high shear mixer. Five (5.0) grams of acrylic acid, 0.1 gram of 2,2-dimethyl-2-phenyl-1-phenylethanone (Esacure KB-1 TM photoinitiator available from Sartomer), and 80 milligrams of hexanediol diacrylate (HDDA) was added to the mixture. This mixture was agitated until the components were thoroughly mixed and then degassed in a vacuum desiccator. Adhesive films were prepared by knife coating the mixture onto the release coated surface of a 50 micrometer biaxially oriented poly(ethyleneterephthalate) (PET) film to provide a coating thickness of about 125 micrometers. The coated surface was then covered with a 50 micrometer release coated PET film. The "sandwich construction" emerging from the knife coater was cured by exposure to 580 to 600 mJ/cm$^2$ of UV radiation from a bank of fluorescent lamps. The film was cooled by blowing air against the bottom layer during irradiation to keep the temperature of the film below 85° C. to avoid wrinkling. Ninety (90) % of the UV radiation was between 300 nm and 400 nm with a maximum at 351 nm as measured by an EIT model UR365CH1 Radiometer available from EIT, Inc. that was spectrally responsive between 300 and 400 nm. Peel adhesion of the adhesive film from stainless steel, glass, polypropylene, and Paint DCT 3000 was measured and is shown in Table I.

Comparative Example C1

An adhesive film mixture containing no poly(α-olefin) was prepared by partially photopolymerizing a mixture of 95 parts IOA, 5 parts AA, and 0.04 parts of KB-1 ™ according to the method taught in U.S. Pat. No. 4,330,590. To this mixture was added 0.08 parts per hundred acrylate (pha) of HDDA and 0.1 pha KB-1 ™ photoinitiator. The adhesive syrup was coated, cured, and tested as described above in Example 1.

Examples 2, 3, and 4

The procedure described in Example 1 was used to prepare three mixtures having an IOA/AA ratio of 95/5 and 50,80, and 100 pha of TX-1771-98. To each mixture was added 0.1 pha of KB-1 and 0.08 pha of HDDA and each coated at a thickness of 125 μm between PET films as described in Example 1. Test data for each adhesive film obtained is given in Table 1.

TABLE I

|  | UNITS | C-1 | 1 | 2 | 3 | 4 |
|---|---|---|---|---|---|---|
| α-olefin | pha | 0 | 30 | 50 | 80 | 100 |
| PEEL ADHESION from: | | | | | | |
| Stainless Steel | | | | | | |
| 90° (20 Min) | N/dm | 92 | 130 | 151 | 134 | — |
| 90° (72 Hr) | N/dm | 120 | 155 | 204 | 141 | 123 |
| Glass | | | | | | |
| 90° (20 Min) | N/dm | 116 | 176 | 180 | 141 | — |
| 90° (72 Hr) | N/dm | 134 | 165 | 211 | 162 | — |
| Polypropylene | | | | | | |
| 90° (20 Min) | N/dm | 67 | 99 | 116 | 162 | — |
| 90° (72 Hr) | N/dm | 67 | 88 | 120 | 165 | 190 |
| Paint DCT 3000 | | | | | | |
| 90° (20 Min) | N/dm | 109 | 116 | 148 | 130 | — |
| 90° (72 Hr) | N/dm | 116 | 134 | 194 | 130 | 99 |
| 90° (1 Wk 70° C.) | N/dm | 176 | 194 | 211 | 127 | — |

The data of Table I show that there is a maxima in polar substrate adhesion (glass, stainless steel) at 50 pha of poly(1-hexene-co-propylene-co-ethylene) (Mole ratio of 68/30/2) and also that with increasing amounts of the poly(α-olefin) can increase the adhesion of the psa to the low energy surface, polypropylene.

Foam-Like PSA A

A foam like psa was prepared from a composition similar to that described in Example C-1 with the exception that the monomers used to prepare the syrup were 90 parts IOA and 10 parts AA. To prepolymerized monomer was added 8 pha of glass microbubbles (Scotchlite ™ C15/250, available from 3M Company) and 4 pha of hydrophobic fumed silica (Degussa "Aerosil" 972, available from Degussa, Gmbh, Hanau, Germany). This adhesive mixture then was coated between a pair of PET films and cured (as described in Example 1) to provide a 1.1 mm thick psa.

Examples 5 and 6 psa film laminates

Adhesive mixtures were prepared and coated as described in Example 1 except that the weight ratio of IOA/AA was 90/10 and the poly(alpha olefin) used was poly(α-olefin)#1 prepared as described herein earlier. The method of comonomer addition was varied. In Example 5, the AA was added to the IOA/poly(1-hexene) mixture all at once following the procedure used in Examples 1–4 herein. In Example 6, the AA was added drop-wise to prevent the poly-alpha olefin from phasing out. Each mixture was coated at a thickness of 0.14 mm between PET films cured, and then laminated to Foam-like psa A using the procedure described in Example 39 of U.S. Pat. No. 4,415,615. The test data are shown in Table II.

Comparative Example C-2

Comparative psa film laminate

An adhesive film was prepared using the method of Example C-1 except 90 parts of IOA and 10 parts of AA were used. The adhesive was laminated to Foam-like psa A as in Examples 5 and 6.

TABLE II

|  | UNITS | C-2 | 5 | 6 |
|---|---|---|---|---|
| α-olefin | pha | 0 | 20 | 20 |
| AA Addition Method | | None | Fast | Slow |
| PEEL ADHESION from: | | | | |
| Stainless Steel | | | | |
| 90° (72 Hr) | N/dm | 127 | 313 | 229 |
| Glass | | | | |
| 90° (72 Hr) | N/dm | 137 | 472 | 299 |
| Polypropylene | | | | |
| 90° (72 Hr) | N/dm | 39 | 106 | 130 |
| Paint DCT 3000 | | | | |
| 90° (1 Wk 70° C.) | N/dm | 348 | 514 | 384 |

The data of Table II show the effect of the rate of AA addition to the adhesive composition on peel adhesion. Rapid addition results in improved adhesion to high energy surfaces like glass, stainless steel, and automotive paint DCT 3000. The low surface energy adhesion is slightly better when the comonomer is added slowly, however, in both Examples 5 and 6 the adhesion is better than that of comparative Example C-2.

Examples 7,8,9,10, and 11

Psa's were prepared using the method of Example 5 with the omission of HDDA and not laminated to foam-like psa A, but using the following photoactive compounds:

| Ex. | g/100 pbw | |
|---|---|---|
| | | Photoinitiator & Crosslinker |
| 7 | 0.08 | 2,4-bis(trichloromethyl)-6-(3,4-dimethoxyphenyl)-s-triazine |
| 8 | 0.08 | 2,4-bis(trichloromethyl)-6-(1-naphthyl)-s-triazine |
| | | Photoinitiator Only |
| 9 | 0.16 | naphthylsulfonyl chloride |
| 10 | 0.11 | 2,4-bis(trichloromethyl)-6-methyl-s-triazine and 2-ethyl-9,10-dimethoxydimethylanthracene (1:1) |
| 11 | 0.09 | 2,4-bis(trichloromethyl)-6-(4-methylphenyl)-s-triazine |

The test data are shown in Table III.

TABLE III

|  | UNITS | 7 | 8 | 9 | 10 | 11 |
|---|---|---|---|---|---|---|
| PEEL ADHESION from: | | | | | | |

TABLE III-continued

|  | UNITS | EXAMPLE NUMBER | | | | |
| --- | --- | --- | --- | --- | --- | --- |
|  |  | 7 | 8 | 9 | 10 | 11 |
| Stainless Steel |  |  |  |  |  |  |
| 90° (72 Hr) | N/dm | 112 | 88 | 99 | 99 | 137* |
| Glass |  |  |  |  |  |  |
| 90° (120 Hr) | N/dm | 148 | 158 | 137 | 74** | 116 |
| Polypropylene |  |  |  |  |  |  |
| 90° (72 Hr) | N/dm | 67 | 70 | 67 | 88** | 70 |
| STATIC SHEAR |  |  |  |  |  |  |
| RT (1000 g) | Minutes | 11766 | 11766 | 51.0 | 11.0 | 20.0 |
| Failure Mode |  | pass | pass | pob/r | coh | coh |
| 70° C. (500 g) | Minutes | 11767 | 11769 | 9.0 | 0 | 1.3 |
| Failure Mode |  | pass | pass | coh | coh | coh |

*Peel off backing with residue
**Peel off glass and peel off backing (aluminum foil) also
coh = Cohesive failure
pob/r = Pop off from backing with some residue The test data of Table III show that only those triazines which are both crosslinkers and initiators give acceptable static shear performance (Examples 7 and 8).

Examples 12, 13, 14, 15, 16 and 17

Adhesive films were prepared according to the method of Example 1, except that IOA/AA (95/5) was used in Examples 12 and 15; IOA/isobornyl acrylate (85/15) was used in Examples 13 and 16; and IOA/N-vinyl pyrrolidone (93/7) was used in Examples 14 and 17, providing compositions having comparable molecular ratio of IOA to high $T_g$ monomer. Examples 12–14 contain 50 phr and Examples 15–17 contain 100 phr of the α-olefin polymer TX-1771-98. 0.15 phw of 2,4-bis(-trichloromethyl)-6-(3,4-dimethoxyphenyl)-s-triazine was used in place of HDDA. The adhesive mixtures were coated on a single liner and crosslinked in a nitrogen atmosphere to provide 125 micrometer thick films. Test data are shown in Table IV.

TABLE IV

|  | UNITS | EXAMPLE NUMBER | | | | | |
| --- | --- | --- | --- | --- | --- | --- | --- |
|  |  | 12 | 13 | 14 | 15 | 16 | 17 |
| PEEL ADHESION from: |  |  |  |  |  |  |  |
| glass |  |  |  |  |  |  |  |
| 90° (72 Hr) | N/dm | 70 | 70 | 77 | 77 | 77 | 81 |
| polypropylene |  |  |  |  |  |  |  |
| 90° (20 Min) | N/dm | 120 | 137 | 141 | 130 | 148 | 144 |
| 90° (72 Hr) | N/dm | 141 | 137 | 141 | 130 | 148 | 144 |
| STATIC SHEAR |  |  |  |  |  |  |  |
| RT (250 g) | Minutes | 1974 | 1638 | 2983 | 1726 | 6194 | 3420 |

The failure mode for the static shear test was by cohesive failure.

The data of Table IV show that there is no significant difference in peel adhesion or in static shear performance regardless of choice of comonomer.

Examples 18 and 19

An adhesive composition was prepared as described in Example 5 with the exception that 0.15 phw of 2,4-bis(trichloromethyl)-6-(3,4-dimethoxyphenyl)-s-triazine was used instead of HDDA. In Example 18, the composition was coated onto the adhesive mixture of Foam-like psa A and cured as described in U.S. Pat. No. 4,818,610 and in Example 19 the composition was coated between PET films, cured, and laminated to Foam-like psa A as described in Example 5. Test data are shown in Table V.

Comparative Example C-3 (Comparative layered psa)

An adhesive was prepared as described in Example C-1 with the exception that 90 parts of IOA and 10 parts of AA were used. The composition was coated onto the adhesive mixture of Foam-like psa A as described in Example 18.

TABLE V

|  | UNITS | EXAMPLE NUMBER | | | |
| --- | --- | --- | --- | --- | --- |
|  |  | C-2 | C-3 | 18 | 19 |
| α-olefin | pha | 0 | 0 | 50 | 50 |
| IOA/AA ratio |  | 90/10 | 90/10 | 90/10 | 90/10 |
| PEEL ADHESION from: |  |  |  |  |  |
| stainless steel |  |  |  |  |  |
| 90° (20 Min) | N/dm | 165 | 148 | 201 | 141 |
| 90° (72 Hr) | N/dm | 158 | 148 | 201 | 141 |
| polypropylene |  |  |  |  |  |
| 90° (20 Min) | N/dm | 46 | 70 | 148 | 155 |
| 90° (72 Hr) | N/dm | 56 | 63 | 197 | 162 |
| STATIC SHEAR |  |  |  |  |  |
| RT 500 g | Minutes | 0 | $10^4$ | 8048 | 0 |

The test data show that better adhesion and superior shear are achieved when the adhesive composition of the invention is coated onto the foamed adhesive than when a film of it is laminated to the foamed adhesive.

Examples 20, 21, 22, and 23

Adhesive films were prepared according to the procedure described in Examples 1–4 with the exception that poly(α-olefin)#2 and poly(α-olefin)#3, prepared as described above and having inherent viscosities of 2.0 and 5.0, respectively, were used in place of TX-1771-98. In Examples 20 and 21 poly(α-olefin)#2 was used and in Examples 22 and 23 poly(α-olefin)#3 was used. The acrylic acid (AA) was added prior to and after pre-prepolymerization in Examples 20 and 22 and in Examples 21 and 23, respectively, the prepolymerization in each example being continued to a syrup having a viscosity of about 3000 cps. The following materials were added to each syrup: 0.1 pha HDDA, 8 pha C15/250 Scotch-Lite ™ glass bubbles, and 2 pha Aerosil ™ R972 fumed silica. The adhesive mixtures were coated between liners and irradiated to provided crosslinked films 1.1 mm thick. The test data are shown in Table VI.

Foam B

Foam-like psa B was prepared as described for the preparation of Foam-like psa. A with the exception that the monomer ratio was 95 parts IOA to 5 parts AA by weight.

TABLE VI

| | UNITS | Foam-like psa B | 20 | 21 | 22 | 23 |
|---|---|---|---|---|---|---|
| I.V. | dl/g | | 2 | 2 | 5 | 5 |
| TENSILE STRENGTH | kPa | 4.1 | 2.8 | 2.8 | 3.4 | 2.8 |
| ELONGATION | % | 815 | 768 | 792 | 808 | 863 |
| PEEL ADHESION from: | | | | | | |
| Stainless Steel 90° (72 Hr) | N/dm | 109 | 151 | 120 | 176 | 165 |
| Glass 90° (72 Hr) | N/dm | 123 | 113 | 120 | 155 | 137 |
| STATIC SHEAR | | | | | | |
| RT 500 g (S.S.) | Minutes | $10^4$ | $10^4$ | 2143 | $10^4$ | 7384 |
| 70° C. 500 g (S.S.) | Minutes | 0 | 0 | 50 | 158 | 34 |
| COLD SLAM | | 5/4 | 2/5 | 2/5 | 8/4 | 1/5 |
| Slam # per | | 8/4 | 2/5 | 2/5 | 8/4 | 2/5 |
| Stage of | | 8/4 | 2/5 | 2/5 | 1/5 | 2/5 |
| failure | | 8/4 | 2/5 | 3/5 | 3/5 | 3/5 |

Example 24

A composition was prepared as described in Example 1 with the exception that poly(1-hexene/-propylene)(60/40), designated as TX 1771-100, and 0.15 phw of 2,4-bis(trichloromethyl)-6-(3,4-dimethoxyphenyl)-s-triazine were used in placed of TX-1771-98 and HDDA, respectively. The mixture was foamed under nitrogen pressure using a 90 mm diameter high shear mixer operating at 900 rpm. The foamed mixture was coated between release coated biaxially-oriented PET films and cured as described in "Typical Tape-Making Procedure" of U.S. Pat. No. 4,415,615. The resulting cellular pressure-sensitive membrane was tested and the results are shown in Table VII.

Comparative Example C-4

A mixture of 95 parts IOA, 5 parts AA, and 0.04 parts of KB-1# photoinitiator was prepolymerized to a syrup having a viscosity of about 3000 cps. To the syrup was added 0.15 phw 2,4-bis(trichloromethyl)-6-(3,4-dimethoxyphenyl)-s-triazine and the resulting syrup was foamed and coated as described in Example 24. The resulting cellular pressure-sensitive membrane was tested and the results are shown in Table VII.

TABLE VII

| | UNITS | EXAMPLE NUMBER | |
|---|---|---|---|
| | | C-4 | 24 |
| PEEL ADHESION from: | | | |
| Stainless Steel | | | |
| 90° (20 Min) | N/dm | 12 | 11 |
| 90° (72 Hr) | N/dm | 44 | 44 |
| Glass | | | |
| 90° (20 Min) | N/dm | 5 | 5 |

TABLE VII-continued

| | UNITS | EXAMPLE NUMBER | |
|---|---|---|---|
| | | C-4 | 24 |
| 90° (72 Hr) | N/dm | 17 | 11 |
| Polypropylene | | | |
| 90° (20 Min) | N/dm | 33 | 109 |
| 90° (72 Hr) | N/dm | 35 | 116 |

The data of Table VII shows that peel adhesion of a cellular pressure-sensitive membrane from polypropylene after 20 min and 72 hr is 109 and 116 N/dm, respectively, for the membrane containing poly(α-olefin), but only 33 and 35 N/dm for the membrane containing no poly(α-olefin).

Examples 25-29 Addition of Hydrophobic Fumed Silica

Using the procedure of Example 1, forty (40) grams of poly(α-olefin)#1 was dissolved in 100 grams of IOA. Five aliquots of 20 grams each of this solution were weighed into 240 ml bottles followed by addition to each of sufficient acrylic acid, KB-1 photoinitiator, and 2,4-bis(trichloromethyl)-6-(3,4-dimethoxyphenyl)-s-triazine to provide solutions that were 90/10 IOA/AA, 0.1 pha by weight KB-1, and 0.15 pbw 2,4-bis(trichloromethyl)-6-(3,4-dimethoxyphenyl)-5-triazine. The aliquots were stirred to dissolve these addenda. The following amounts of hydrophobic fumed silica (Degussa Aerosil ™ R-972) were added respectively to the five aliquots: none, 650,865, 1,080, and 1,300 milligrams, i.e., to provide 0, 3, 4, 5, 6 pbw of adhesive composition. The components were again stirred to provide a homogeneous mixture. The solutions were aged in the dark for 18 hours at room temperature, degassed in a vacuum desiccator. The adhesive compositions were coated on a single liner and radiation cured under nitrogen to yield adhesive films of 125 micrometer thickness. Test results are shown in Table VIII. The static shear test (less than $10^4$ minutes) failed adhesively.

TABLE VIII

| | UNITS | EXAMPLE NUMBER | | | | |
|---|---|---|---|---|---|---|
| | | 25 | 26 | 27 | 28 | 29 |
| Silica loading | pbw | 0 | 3 | 4 | 5 | 6 |
| PEEL ADHESION from: | | | | | | |
| stainless steel 90° (72 Hr) | N/dm | 90 | 93 | 102 | 102 | 104 |
| polypropylene 90° (72 Hr) | N/dm | 77 | 82 | 93 | 88 | 88 |
| STATIC SHEAR | | | | | | |
| Room Temp (1000 grams) | Minutes | 103 | $10^4$ | $10^4$ | $10^4$ | $10^4$ |
| 70° C. (500 grams) | Minutes | 14 | 257 | 659 | 9768 | $10^4$ |

Example 30

The procedure of Example 1 was repeated to prepare a poly(α-olefin)#1/polyacrylate syrup using the following reactants: 20 grams of poly(α-olefin)#1, 95 grams of isooctyl acrylate, 5 grams of acrylic acid, 0.1 gram of Esacure KB-1 ™ photoinitiator, and 100 milligrams of hexanediol diacrylate (HDDA). Knife coated adhesive films were prepared using the process of Example 1. The cured adhesive film had a peel adhesion from glass of 183 N/dm. The static shear adhesion of this film was not measured.

Comparative Example C-5

The following materials were placed in a glass reaction bottle: 95 grams of isooctyl acrylate, 5 grams of acrylic acid, 20 grams of poly[α-olefin]#1] (I.V. 1.2 dl/gm), 100 grams of toluene, and 0.2 grams of benzoyl peroxide. The reaction bottle was purged with nitrogen and sealed. It was placed in a 60° C. bath and tumbled therein for 24 hours to polymerize the acrylic monomers. The resulting solution of acrylic and α-olefin polymers was knife coated onto a 37 micrometer polyester film to provide a dry coating thickness of 38 micrometers. The coated film was equilibrated for 24 hours and thereafter tested under constant temperature and humidity. Adhesive had a peel adhesion of 64 N/dm on glass and shear of 10 minutes on stainless steel.

Comparative Example C-6

To the solution of the adhesive composition from the above reaction was added 1 per cent of benzophenone and knife coated onto a 37 micrometer polyester film to provide a dry coating thickness of 38 micrometers. The coated film was equilibrated as above and was cured in nitrogen with 250 mJ/cm$^2$ of energy using medium pressure mercury lamp. The cured adhesive has a peel adhesion of 62 N/dm from glass and shear of 550 minutes on stainless steel.

EXAMPLE 31

The procedure of Example 1 was repeated to prepare a poly(α-olefin)#1/polyacrylate using the following reactants: 20 grams of poly(α-olefin)#1,100 grams of isooctyl acrylate, 0.1 gram of 2,2-dimethyl-2-phenyl-1-phenylethanone (Esacure KB-1 TM) photoinitiator, and 100 milligrams of hexanediol diacrylate (HDDA). Knife coated adhesive films were prepared using the process of Example 1. The peel adhesions of this film from various substrates are shown in Table IX. The static shear adhesion of this film was not measured.

Comparative Example C-7

Ten (10) grams of Wingtak+ TM, a C$_5$-olefin tackifying resin available from Goodyear, was thoroughly mixed into the syrup of Example 31 prior to knife coating and cure of the syrup to form an adhesive film using the process of Example 1. The peel adhesion of this film from various substrates are shown in Table IX. The static shear adhesion of this film was not measured.

TABLE IX

|  |  | Example 31 | C-7 |
|---|---|---|---|
| Peel Adhesion |  |  |  |
| Stainless Steel 90° (72 hr) | N/dm | 49.5 | 24.6 |
| Glass 90° (72 hr) | N/dm | 52.8 | 31.6 |
| Polypropylene 90° (72 hr) | N/dm | 91.5 | 24.6 |

The above data show that the addition of tackifier reduces the peel adhesion of the adhesive, irrespective of the surface, which may be attributed to the incompatibility of the tackifier in the acrylate/olefin blend. This incompatibility results in the migration of tackifier to the surface and as a consequence, loss of peel adhesion.

Reasonable variations and modifications are possible from the foregoing disclosure without departing from either the spirit or scope of the present invention as defined in the claims.

We claim:

1. A radiation-curable tackifier-free composition comprising:
   a) 100 parts by weight (pbw) of a blend of:
      i) 60 to 100 pbw acrylic acid esters of monohydric alcohols having an average of 4 to 12 carbon atoms; and
      ii) 0 to about 40 pbw monoethylenically-unsaturated copolymerizable monomer whose homopolymer has a T$_g$ greater than about 50° C.;
   b) 10 to 100 pbw of polymer of alpha-olefins having a T$_g$ in the range of about −70° C. to −10° C. and having a weight average molecular weight of about 25,000 to about 5,000,000 wherein at least 60 mole percent of the alpha-olefins have 6 to 18 carbon atoms; and
   c) photochemically effective amount of a material selected from the group consisting of: (i) photoinitiator, (ii) photoinitiator and a polyfunctional acrylate crosslinker; and (iii) a photoinitiator that is also a photocrosslinker.

2. The radiation-curable, tackifier-free composition according to claim 1 comprising about 70–95 pbw of said acrylic acid ester.

3. The radiation-curable, tackifier-free composition according to claim 1 comprising about 5–30 pbw of said monoethylenically-unsaturated copolymerizable monomer.

4. The radiation-curable, tackifier-free composition according to claim 1 wherein said monoethylenically-unsaturated copolymerizable monomer is a strongly polar monomer.

5. The radiation-curable, tackifier-free composition according to claim 1 wherein said monoethylenically-unsaturated copolymerizable monomer is a moderately polar monomer.

6. The radiation-curable, tackifier-free composition according to claim 1 comprising 30 to 70 pbw of said alpha-olefin polymer.

7. The radiation-curable, tackifier-free composition according to claim 1 wherein said alpha-olefin polymer has a T$_g$ in the range of about −60° C. to −25° C.

8. The radiation-curable, tackifier-free composition according to claim 1 wherein said alpha-olefin polymer has a weight average molecular weight of about 50,000 to about 3,500,000.

9. The radiation-curable, tackifier-free composition according to claim 1 wherein said alpha-olefin polymer has a weight average molecular weight of about 50,000 to about 250,000.

10. The radiation-curable, tackifier-free composition according to claim 1 wherein at least 80 mole percent of said alpha-olefins of said alpha-olefin polymer have 6 to 12 carbon atoms.

11. A radiation-curable, tackifier-free composition according to claim 1 wherein said photoinitiator is one selected from the group consisting of: benzoin ethers; substituted acetophenones; substituted alpha-ketols; aromatic sulfonyl chlorides; and photoactive oximes.

12. A radiation-curable, tackifier-free composition according to claim 1 wherein said photoinitiator and said photocrosslinker is a trihalomethyl-s-triazine.

13. The radiation-curable, tackifier-free composition according to claim 1 further comprising hollow polymeric microspheres.

14. The radiation-curable, tackifier-free composition according to claim 1 further comprising glass microspheres.

15. The radiation-curable, tackifier-free composition according to claim 1 further comprising hydrophobic silica.

16. A pressure-sensitive adhesive prepared by the process of exposing the radiation-curable composition of claim 1 to radiation having a wavelength in the range of from about 280 to 400 nm.

17. The pressure-sensitive adhesive of claim 16 wherein the total dose of radiation is between about 400–600 milliJoule/cm$^2$.

18. A pressure-sensitive adhesive prepared by the process of exposing the radiation-curable composition of claim 6 to radiation having a wavelength in the range of from about 280 to 400 nm.

19. A pressure-sensitive adhesive prepared by the process of exposing the radiation-curable composition of claim 7 to radiation having a wavelength in the range of from about 280 to 400 nm.

20. A pressure-sensitive adhesive prepared by the process of exposing the radiation-curable composition of claim 8 to radiation having a wavelength in the range of from about 280 to 400 nm.

21. A pressure-sensitive adhesive prepared by the process of exposing the radiation-curable composition of claim 9 to radiation having a wavelength in the range of from about 280 to 400 nm.

22. A pressure-sensitive adhesive prepared by the process of exposing the radiation-curable composition of claim 11 to radiation having a wavelength in the range of from about 280 to 400 nm.

23. A pressure-sensitive adhesive prepared by the process of exposing the radiation-curable composition of claim 12 to radiation having a wavelength in the range of from about 280 to 400 nm.

24. A pressure-sensitive adhesive prepared by the process of exposing the radiation-curable composition of claim 13 to radiation having a wavelength in the range of from about 280 to 400 nm.

25. A pressure-sensitive adhesive prepared by the process of exposing the radiation-curable composition of claim 15 to radiation having a wavelength in the range of from about 280 to 400 nm.

26. A pressure-sensitive adhesive tape comprising the pressure-sensitive adhesive of claim 16 coated on a suitable substrate.

27. The pressure-sensitive adhesive tape of claim 26 wherein said suitable substrate is siliconized poly(ethylene terephthalate).

28. The pressure-sensitive adhesive tape of claim 26 wherein the pressure-sensitive adhesive has a cellular structure.

29. The pressure-sensitive adhesive tape of claim 28 wherein the pressure-sensitive adhesive is in the form of a cellular membrane.

* * * * *

UNITED STATES PATENT AND TRADEMARK OFFICE
CERTIFICATE OF CORRECTION

PATENT NO. : 5,202,361
DATED : April 13, 1993
INVENTOR(S) : Zimmerman et al.

It is certified that error appears in the above-identified patent and that said Letters Patent is hereby corrected as shown below:

Col. 1, line 68     "and 10 to 100" should be --and (b) 10 to 100--

Col. 13, line 51    "IOA" should be --IOA--

Col. 13, line 52    "KB-1#" should be --KB-1$^{TM}$--

Signed and Sealed this

Third Day of May, 1994

Attest:

BRUCE LEHMAN

Attesting Officer

Commissioner of Patents and Trademarks